US008923630B2

(12) United States Patent
Guo et al.

(10) Patent No.: US 8,923,630 B2
(45) Date of Patent: Dec. 30, 2014

(54) ENHANCED MAX MARGIN LEARNING ON MULTIMODAL DATA MINING IN A MULTIMEDIA DATABASE

(71) Applicant: The Research Foundation of State University of New York, Binghamton, NY (US)

(72) Inventors: Zhen Guo, Elkins Park, PA (US); Zhongfei Zhang, Vestal, NY (US)

(73) Assignee: The Research Foundation for the State University of New York, Binghamton, NY (US)

( * ) Notice: Subject to any disclaimer, the term of this patent is extended or adjusted under 35 U.S.C. 154(b) by 0 days.

(21) Appl. No.: 13/903,018

(22) Filed: May 28, 2013

(65) Prior Publication Data
US 2013/0251248 A1     Sep. 26, 2013

Related U.S. Application Data

(62) Division of application No. 12/538,845, filed on Aug. 10, 2009, now Pat. No. 8,463,035.

(60) Provisional application No. 61/087,169, filed on Aug. 8, 2008.

(51) Int. Cl.
*G06K 9/62* (2006.01)
*G06F 17/10* (2006.01)
*G06F 17/30* (2006.01)

(52) U.S. Cl.
CPC  *G06F 17/10* (2013.01); *G06K 9/62* (2013.01); *G06F 17/30* (2013.01); *G06K 9/6269* (2013.01); *G06K 9/629* (2013.01)
USPC ........................................................ 382/225

(58) Field of Classification Search
CPC ........................... G06K 9/6292; G06K 9/6269
USPC .............................. 382/225, 224, 159; 706/12
See application file for complete search history.

(56) References Cited

U.S. PATENT DOCUMENTS

| 7,756,341 B2 * | 7/2010 | Perronnin | 382/224 |
| 8,126,274 B2 * | 2/2012 | Li et al. | 382/224 |
| 8,463,053 B1 * | 6/2013 | Guo et al. | 382/225 |

OTHER PUBLICATIONS

Guo et al., A Max Margin Framework on Image Annotation and Multimodal Image Retrieval [on-line], Jul. 2-5, 2007 [retrieved on Oct. 21, 2013], 2007 IEEE International Conference on Multimedia and Expo, pp. 504-507. Retrieved from the Internet: http://ieeexplore.ieee.org/xpls/abs_all.jsp?arnumber=4284697&tag=1.*

(Continued)

*Primary Examiner* — Matthew Bella
*Assistant Examiner* — Dennis Rosario
(74) *Attorney, Agent, or Firm* — Steven M. Hoffberg; Ostrolenk Faber LLP

(57) ABSTRACT

Multimodal data mining in a multimedia database is addressed as a structured prediction problem, wherein mapping from input to the structured and interdependent output variables is learned. A system and method for multimodal data mining is provided, comprising defining a multimodal data set comprising image information; representing image information of a data object as a set of feature vectors in a feature space; clustering in the feature space to group similar features; associating a non-image representation with a respective image data object based on the clustering; determining a joint feature representation of a respective data object as a mathematical weighted combination of a set of components of the joint feature representation; optimizing a weighting for a plurality of components of the mathematical weighted combination with respect to a prediction error between a predicted classification and a training classification; and employing the mathematical weighted combination for automatically classifying a new data object.

16 Claims, 6 Drawing Sheets

(56) References Cited

OTHER PUBLICATIONS

Yang et al., Region-based Image Annotation using Asymmetrical Support Vector Machine-based Multiple-Instance Learning [on-line], 2006 [retrieved on Oct. 21, 2013], 2006 IEEE Computer Society Conference on Computer Vision and Pattern Recognition, vol. 2, 7 total pages. Retrieved from the Internet: http://ieeexplore.ieee.org/xpls/abs_all.jsp?arnumber=1.*

Brefeld et al., Multi-view Discriminative Sequential Learning [on-line], Oct. 3-7, 2005 [retrieved on Oct. 21, 2013], Machine Learning: 16$^{th}$ European Conference on Machine Learning 2005: Lecture Notes in Computer Science, vol. 3720, pp. 60-71. Retrieved from the Internet: http://link.springer.com/chapter/10.1007/11564096_11#.*

Gonzalez-Mendoza et al., Driver Vigilance Monitoring, a New Approach [on-line], Jun. 17-21, 2002 [retrieved on Oct. 21, 2013], IEEE Intelligent Vehicle Symposium, vol. 2, pp. 358-363. Retrieved from the Internet: http://ieeexplore.ieee.org/xpls/abs_all.jsp?arnumber=1187978&tag=1.*

Osuna et al., An Improved Training Algorithm for Support Vector Machines [on-line], Sep. 24-26, 1997 [retrieved on Oct. 21, 2013], Proceedings of the 1997 IEEE Workshop Neural Networks for Signal Processing VII, pp. 276-285. Retrieved from the Internet: http://ieeexplore.ieee.org/xpls/abs_all.jsp?arnumber=622408&tag=1.*

\* cited by examiner

ENHANCED MAX MARGIN LEARNING ON MULTIMODAL DATA MINING IN A MULTIMEDIA DATABASE

CROSS REFERENCE TO RELATED APPLICATIONS

The application is a Division of U.S. patent application Ser. No. 12/538,845, filed Aug. 10, 2009, now U.S. Pat. No. 8,463,035, issued Jun. 11, 2013, which is a Non-Provisional of U.S. Provisional Patent Application No. 61/087,169, filed Aug. 8, 2008, each of which is expressly incorporated herein by reference.

GOVERNMENT SUPPORT STATEMENT

This invention was made with Government Support under IIS-0535162 awarded by the National Science Foundation. The Government has certain rights in this invention.

1. INTRODUCTION

Multimodal data mining in a multimedia database is a challenging topic in data mining research. Multimedia data may consist of data in different modalities, such as digital images, audio, video, and text data. In this context, a multimedia database refers to a data collection in which there are multiple modalities of data such as text and imagery. In this database system, the data in different modalities are related to each other. For example, the text data are related to images as their annotation data. By multimodal data mining in a multimedia database it is meant that the knowledge discovery to the multimedia database is initiated by a query that may also consist of multiple modalities of data such as text and imagery. A multimedia database is provided having an image database in which each image has a few textual words given as annotation. The problem of multimodal data mining in such an image database is addressed as the problem of retrieving similar data and/or inferencing new patterns to a multimodal query from the database.

Specifically, multimodal data mining refers to two aspects of activities. The first is the multimodal retrieval. This is the scenario where a multimodal query consisting of either textual words alone, or imagery alone, or in any combination is entered and an expected retrieved data modality is specified that can also be text alone, or imagery alone, or in any combination; the retrieved data based on a pre-defined similarity criterion are returned back to the user. The second is the multimodal inferencing. While the retrieval based multimodal data mining has its standard definition in terms of the semantic similarity between the query and the retrieved data from the database, the inferencing based mining depends on the specific applications. One application of the present technology is directed toward fruit fly image database mining. Consequently, the inferencing based multimodal data mining may include many different scenarios. A typical scenario is the across-stage multimodal inferencing. There are many interesting questions a biologist may want to ask in the fruit fly research given such a multimodal mining capability. For example, given an embryo image in stage 5, what is the corresponding image in stage 7 for an image-to-image three-stage inferencing? What is the corresponding annotation for this image in stage 7 for an image-to-word three-stage inferencing? The multimodal mining technique according to an embodiment of the present invention also addresses this type of across-stage inferencing capability, in addition to the multimodal retrieval capability.

In the image retrieval research area, one of the notorious bottlenecks is the semantic gap [18]. Recently, it is reported that this bottleneck may be reduced by the multimodal data mining approaches [3, 11] which take advantage of the fact that in many applications image data typically co-exist with other modalities of information such as text. The synergy between different modalities may be exploited to capture the high level conceptual relationships.

To exploit the synergy among the multimodal data, the relationships among these different modalities need to be learned. For an image database, the relationship between images and text should be learned. The learned relationship between images and text can then be further used in multimodal data mining. Without loss of generality, a special case of the multimodal data mining problem—image annotation, where the input is an image query and the expected output is the annotation words, is analyzed. This approach is also valid to the general multimodal data mining problem. The image annotation problem can be formulated as a structured prediction problem where the input (image) x and the output (annotation) y are structures. An image can be partitioned into blocks which form a structure. The word space can be denoted by a vector where each entry represents a word. Under this setting, the learning task is therefore formulated as finding a function $f: X \times Y \rightarrow$ such that $$\hat{y} = \underset{y \in Y}{\operatorname{argmax}} f(x, y) \quad (1)$$

is the desired output for any input x.

Built upon the existing literature on the max margin learning, a new max margin learning approach is provided on the structured output space to learn the above function. Like the existing max margin learning methods, the image annotation problem may be formulated as a quadratic programming (QP) problem. The relationship between images and text is discovered once this QP problem is solved. Unlike the existing max margin learning methods, the new max margin learning method is much more efficient with a much faster convergence rate. Consequently, this new max margin learning approach is called Enhanced Max Margin Learning (EMML). EMML is further applied for solving the multimodal data mining problem effectively and efficiently.

Note that the proposed approach is general that can be applied to any structured prediction problems. For the evaluation purpose, this approach is applied to the Berkeley Drosophila embryo image database. Extensive empirical evaluations against a state-of-the-art method on this database are reported.

2. RELATED WORK

Multimodal approaches have recently received the substantial attention since Barnard and Duygulu et al. started their pioneering work on image annotation [3, 10]. Recently there have been many studies [4, 17, 11, 7, 9, 23] on the multimodal approaches.

The learning with structured output variables covers many natural learning tasks including named entity recognition, natural language parsing, and label sequence learning. There have been many studies on the structured model which include conditional random fields [14], maximum entropy model [15], graph model [8], semi-supervised learning [6] and max margin approaches [13, 21, 20, 2]. The challenge of learning with structured output variables is that the number of the structures is exponential in terms of the size of the structure output space. Thus, the problem is intractable if we treat each structure as a separate class. Consequently, the multi-class approach is not well fitted into the learning with structured output variables.

As an effective approach to this problem, the max margin principle has received substantial attention since it was used in the support vector machine (SVM) [22]. In addition, the perceptron algorithm is also used to explore the max margin classification [12]. Taskar et al. [19] reduce the number of the constraints by considering the dual of the loss-augmented problem. However, the number of the constraints in their approach is still large for a large structured output space and a large training set.

For learning with structured output variables, Tsochantaridis et al. [21] propose a cutting plane algorithm which finds a small set of active constraints. One issue of this algorithm is that it needs to compute the most violated constraint which would involve another optimization problem in the output space. In EMML, instead of selecting the most violated constraint, a constraint may be arbitrarily selected which violates the optimality condition of the optimization problem. Thus, the selection of the constraints does not involve any optimization problem. Osuna et al. [16] propose the decomposition algorithm for the support vector machine. In EMML, their idea is extended to the scenario of learning with structured output variables.

3. HIGHLIGHTS

An aspect of the present invention, is based on the existing literature on max margin learning, and aims at solving for the problem of multimodal data mining in a multimedia database. Significant enhancements include: (1) a new max margin learning approach—the enhanced max margin learning framework that is much more efficient in learning with a much faster convergence rate, which is verified in empirical evaluations; (2) application of this EMML approach to developing an effective and efficient solution to the multimodal data mining problem that is highly scalable in the sense that the query response time is independent of the database scale, allowing facilitating a multimodal data mining querying to a very large scale multimedia database, and excelling many existing multimodal data mining methods in the literature that do not scale up at all; this advantage is also supported through the complexity analysis as well as empirical evaluations against a state-of-the-art multimodal data mining method from the literature.

4. LEARNING IN THE STRUCTURED OUTPUT SPACE

Assume that the image database consists of a set of instances $S=\{(I_i,W_i)\}_{i=1}^{L}$ where each instance consists of an image object Ii and the corresponding annotation word set $W_i$. First an image is partitioned into a set of blocks. Thus, an image can be represented by a set of sub-images. The feature vector in the feature space for each block can be computed from the selected feature representation. Consequently, an image is represented as a set of feature vectors in the feature space. A clustering algorithm is then applied to the whole feature space to group similar feature vectors together. The centroid of a cluster represents a visual representative (referred to herein as VRep) in the image space. In FIG. 1, there are two VReps, water and duck in the water. The corresponding annotation word set can be easily obtained for each VRep. Consequently, the image database becomes the VRep-word pairs $S=\{(x_i,y_i)\}_{i=1}^{n}$, where n is the number of the clusters, $x_i$ is a VRep object and $y_i$ is the word annotation set corresponding to this VRep object. Another simple method to obtain the VRepword pairs is that some images are randomly selected from the image database and each image is viewed as a VRep.

Suppose that there are W distinct annotation words. An arbitrary subset of annotation words is represented by the binary vector $\bar{y}$ whose length is W; the j-th component $\bar{y}_j=1$ if the j-th word occurs in this subset, and 0 otherwise. All possible binary vectors form the word space Y. $w_j$ is used to denote the j-th word in the whole word set. x is used to denote an arbitrary vector in the feature space. FIG. 1 shows an illustrative example in which the original image is annotated by duck and water which are represented by a binary vector. There are two VReps after the clustering and each has a different annotation. In the word space, a word may be related to other words. For example, duck and water are related to each other because water is more likely to occur when duck is one of the annotation words. Consequently, the annotation word space is a structured output space where the elements are interdependent.

The relationship between the input example VRep x and an arbitrary output $\bar{y}$ is represented as the joint feature mapping $\Phi(x, \bar{y})$, $\Phi: X \times Y \to^d$ where d is the dimension of the joint feature space. It can be expressed as a linear combination of the joint feature mapping between x and all the unit vectors. That is $$\Phi(x, \bar{y}) = \sum_{j=1}^{W} \bar{y}_j \Phi(x, e_j)$$

where $e_j$ is the j-th unit vector. The score between x and $\bar{y}$ can be expressed as a linear combination of each component in the joint feature representation: $f(x, \bar{y}) = \langle \alpha, \Phi(x, \bar{y}) \rangle$. Then the learning task is to find the optimal weight vector $\alpha$ such that the prediction error is minimized for all the training instances. That is $$\operatorname*{argmax}_{\bar{y} \in Y_i} f(x_i, y) \approx y_i,$$

$$i = 1, \ldots, n$$

where $Y_i = \{\bar{y} | \Sigma_{j=1}^{W} \bar{y}_j = \Sigma_{j=1}^{W} y_{ij}\}$. $\Phi_i(\bar{y})$ is used to denote $\Phi(x_i, \bar{y})$. To make the prediction to be the true output $y_i$, we should follow $$\alpha^T \Phi_i(y_i) \geq \alpha^T \Phi_i(\bar{y}), \forall \bar{y} \in Y_i \setminus \{y_i\}$$

where $Y_i \setminus \{y_i\}$ denotes the removal of the element $y_i$ from the set $Y_i$. In order to accommodate the prediction error on the training examples, the slack variable $\xi_i$ is introduced. The above constraint then becomes $$\alpha^T \Phi_i(y_i) \geq \alpha^T \Phi_i(\bar{y}) - \xi_i, \xi_i \geq 0 \forall \bar{y} \in Y_i \setminus \{y_i\}$$

The prediction error is measured on the training instances by the loss function which is the distance between the true output $y_i$ and the prediction $\bar{y}$. The loss function measures the goodness of the learning model. The standard zero-one classification loss is not suitable for the structured output space. The loss function $l(\bar{y}, y_i)$ is defined as the number of the different entries in these two vectors. The loss function is included in the constraints as is proposed by Taskar et al. [19]

$$\alpha^T \Phi_i(y_i) \geq \alpha^T \Phi_i(\bar{y}) + l(y, y_i) - \xi_i$$

$$\frac{1}{\|\alpha\|}\alpha^T[\Phi_i(y_i)-\Phi_i(\bar{y})]$$

is interpreted as the margin of $y_i$ over another $\bar{y} \in Y^{(i)}$. The above constraint is rewritten as $$\frac{1}{\|\alpha\|}\alpha^T[\Phi_i(y_i)-\Phi_i(\bar{y})] \geq \frac{1}{\|\alpha\|}[l(\bar{y},y_i)-\xi_i].$$

Thus, minimizing $\|\alpha\|$ maximizes such margin.

The goal now is to solve the optimization problem $$\min \frac{1}{2}\|\alpha\|^2 + C\sum_{i=1}^n \xi_i^r \quad (2)$$

$$s.t. \quad \alpha^T \Phi_i(y_i) - \Phi_i(\bar{y}) + l(\bar{y},y_i) - \xi_i$$

$$\forall \bar{y} \in Y_i \setminus \{y_i\} \; \xi_i \geq 0, \quad i=1,\ldots,n$$

where r=1, 2 corresponds to the linear or quadratic slack variable penalty. The linear slack variable penalty is used. For r=2, similar results are obtained. C>0 is a constant that controls the tradeoff between the training error minimization and the margin maximization.

Note that in the above formulation, the relationships between different words in the word space are not introduced. However, the relationships between different words are implicitly included in the VRep-word pairs because the related words are more likely to occur together. Thus, Eq. (2) is in fact a structured optimization problem.

4.1 EMML Framework

One can solve the optimization problem Eq. (2) in the primal space—the space of the parameters $\alpha$. In fact this problem is intractable when the structured output space is large because the number of the constraints is exponential in terms of the size of the output space. As in the traditional support vector machine, the solution can be obtained by solving this quadratic optimization problem in the dual space—the space of the Lagrange multipliers. Vapnik [22] and Boyd et al. [5] have an excellent review for the related optimization problem.

The dual problem formulation has an important advantage over the primal problem: it only depends on the inner products in the joint feature representation defined by $\Phi$, allowing the use of a kernel function. The Lagrange multiplier $\mu_{i,\bar{y}}$ is introduced for each constraint to form the Lagrangian. $\Phi_{i,y_i,\bar{y}} = \Phi_i(y_i) - \Phi_i(\bar{y})$ and the kernel function $K((x_i,\bar{y}),(x_j,\tilde{y})) = <\Phi_{i,y_i,\bar{y}},\Phi_{j,y_j,\tilde{y}}>$ are defined. The derivatives of the Lagrangian over $\alpha$ and $\xi_i$ should be equal to zero. Substituting these conditions into the Lagrangian, the following Lagrange dual problem is obtained $$\min \frac{1}{2}\sum_{\substack{i,j \\ \bar{y}\neq y_i \\ \bar{y}\neq y_j}} \mu_{i,\bar{y}}\mu_{j,\tilde{y}} K((x_i,\tilde{y})) - \sum_{\substack{i \\ \bar{y}\neq y_i}} \mu_{i,\bar{y}} l(\bar{y},y_i) \quad (3)$$

s.t.

$$\sum_{\bar{y}\neq y_i} \mu_{i,\bar{y}} \leq C \mu_{i,\bar{y}} \geq 0, \quad i=1,\ldots,n$$

After this dual problem is solved, we have $\alpha = \sum_{i,\bar{y}} \mu_{i,\bar{y}} \Phi_{i,y_i,\bar{y}}$.

For each training example, there are a number of constraints related to it. The subscript i is used to represent the part related to the i-th example in the matrix. For example, let $\mu_i$ be the vector with entries $\mu_{i,\bar{y}}$. The $\mu_i$ is stacked together to form the vector $\mu$. That is $\mu=[\mu_1^T \ldots \mu_n^T]^T$. Similarly, let $S_i$ be the vector with entries $l(\bar{y},y_i)$. $S_i$ are stacked together to form the vector S. That is $S=[S_1^T \ldots S_n^T]^T$. The lengths of $\mu$ and S are the same. $A_i$ is defined as the vector which has the same length as that of $\mu$, where $A_i,\bar{y}=1$ and $A_j,\bar{y}=0$ for $j\neq i$. Let $A=[A_1 \ldots A_n]^T$. Let matrix D represent the kernel matrix where each entry is $K((x_i,\bar{y}),(x_j,\tilde{y}))$. Let C be the vector where each entry is constant C.

With the above notations the Lagrange dual problem may be rewritten as follows $$\min \frac{1}{2}\mu^T D \mu - \mu^T S \quad (4)$$

$$s.t. \quad \begin{aligned} A\mu &\leq C \\ \mu &\geq 0 \end{aligned}$$

where $\leq$ and $\geq$ represent the vector comparison defined as entry-wise less than or equal to and greater than or equal to, respectively.

Eq. (4) has the same number of the constraints as Eq. (2). However, in Eq. (4) most of the constraints are lower bound constraints ($\mu \geq 0$) which define the feasible region. Other than these lower bound constraints, the rest constraints determine the complexity of the optimization problem. Therefore, the number of constraints is considered to be reduced in Eq. (4). However, the challenge still exists to solve it efficiently since the number of the dual variables is still huge. Osuna et al. [16] propose a decomposition algorithm for the support vector machine learning over large data sets. This idea may be extended to learning with the structured output space. The constraints of the optimization problem Eq. (2) may be decomposed into two sets: the working set B and the nonactive set N. The Lagrange multipliers are also correspondingly partitioned into two parts $\mu_B$ and $\mu_N$. We are interested in the subproblem defined principally for the dual variable set $\mu_B$ when keeping $\mu_N=0$.

This subproblem is formulated as follows.

$$\min \frac{1}{2}\mu^T D \mu - \mu^T S \quad (5)$$

$$s.t. \quad \begin{aligned} A\mu &\leq C \\ \mu_B &\geq 0, \quad \mu_N=0 \end{aligned}$$

It is clearly true that those $\mu_{i,\bar{y}}=0$, $\mu_{i,\bar{y}} \in \mu_B$ can be moved to set $\mu_N$ without changing the objective function. Furthermore, those $\mu_{i,\bar{y}} \in \mu_N$ satisfying certain conditions can be moved to set $\mu_B$ to form a new optimization subproblem which yields a strict decrease in the objective function in Eq. (4) when the new subproblem is optimized. This property is guaranteed by the following theorem.

Theorem 1. Given an optimal solution of the subproblem defined on $\mu_B$ in Eq. (5), if the following conditions hold true:

$$\exists i, \quad \sum_{\bar{y}} \mu_{i,\bar{y}} < C \quad (6)$$

$$\exists \mu_{i,\bar{y}} \in \mu_N, \quad \alpha^T \Phi_{i,y_i,\bar{y}} - l(\bar{y}, y_i) < 0$$

the operation of moving the Lagrange multiplier $\mu_{i,\bar{y}}$ satisfying Eq. (6) from set $\mu_N$ to set $\mu_B$ generates a new optimization subproblem that yields a strict decrease in the objective function in Eq. (4) when the new subproblem in Eq. (5) is optimized.

Proof. Suppose that the current optimal solution is $\mu$. Let $\delta$ be a small positive number. Let $\bar{\mu} = \mu + \delta e_r$, where $e_r$ is the r-th unit vector and $r = (i, \bar{y})$ denotes the Lagrange multiplier satisfying condition Eq. (6). Thus, the objective function becomes $$\begin{aligned} W(\bar{\mu}) &= \frac{1}{2}(\mu + \delta e_r)^T D(\mu + \delta e_r) - (\mu + \delta e_r)^T S \\ &= \frac{1}{2}(\mu^T D\mu + \delta e_r^T D\mu + \delta \mu^T D e_r + \delta^2 e_r^T D e_r) - \mu^T S - \delta e_r^T S \\ &= W(\mu) + \frac{1}{2}(\delta e_r^T D\mu + \delta \mu^T D e_r + \delta^2 e_r^T D e_r) - \delta e_r^T S \\ &= W(\mu) + \delta e_r^T D\mu - \delta e_r^T S + \frac{1}{2}\delta^2 e_r^T D e_r \\ &= W(\mu) + \delta(\alpha^T \Phi_{i,y_i,\bar{y}} - l(\bar{y}, y_i)) + \frac{1}{2}\delta^2 \|\Phi_{i,y_i,\bar{y}}\|^2 \end{aligned}$$

Since $\alpha^T \Phi_{i,y_i,\bar{y}} - l(\bar{y}, y_i) < 0$, for small enough $\delta$, $W(\bar{\mu}) < W(\mu)$. For small enough $\delta$, the constraints $A\bar{\mu} \leq C$ is also valid. Therefore, when the new optimization subproblem in Eq. (5) is optimized, there must be an optimal solution no worse than $\bar{\mu}$.

In fact, the optimal solution is obtained when there is no Lagrange multiplier satisfying the condition Eq. (6). This is guaranteed by the following theorem.

Theorem 2. The optimal solution of the optimization problem in Eq. (4) is achieved if and only if the condition Eq. (6) does not hold true.

Proof. If the optimal solution $\hat{\mu}$ is achieved, the condition Eq. (6) must not hold true. Otherwise, $\hat{\mu}$ is not optimal according to the Theorem 1. To prove in the reverse direction, the Karush-Kuhn-Tucker (KKT) conditions [5] of the optimization problem Eq. (4) are considered.

$D\mu - S + A^T\gamma - \pi = 0$ $\gamma^T(C - A\mu) = 0$ $\pi^T\mu = 0$ $\gamma \geq 0$ $\pi \geq 0$ For the optimization problem Eq. (4), the KKT conditions provide necessary and sufficient conditions for optimality. One can check that the condition Eq. (6) violates the KKT conditions. On the other hand, one can check that the KKT conditions are satisfied when the condition Eq. (6) does not hold true. Therefore, the optimal solution is achieved when the condition Eq. (6) does not hold true.

The above theorems suggest the Enhanced Max Margin Learning (EMML) algorithm listed in Algorithm 1. The correctness (convergence) of EMML algorithm is provided by Theorem 3.

Algorithm 1: EMML Algorithm
Input: n labeled examples, dual variable set p.
Output: Optimized p.
1: procedure
2: Arbitrarily decompose $\mu$ into two sets, $\mu_B$ and $\mu_N$.
3: Solve the subproblem in Eq. (5) defined by the variables in $\mu_B$.
4: While there exists $\mu_{i,\bar{y}} \in \mu_B$ such that $\mu_{i,\bar{y}} = 0$, move it to set $\mu_N$.
5: While there exists $\mu_{i,\bar{y}} \in \mu_N$ satisfying condition Eq. (6), move it to set $\mu_B$. If no such $\mu_{i,\bar{y}} \in \mu_N$ exists, the iteration exits.
6: Go to step 4.
7: end procedure.

Theorem 3. EMML algorithm converges to the global optimal solution in a finite number of iterations.

Proof. This is the direct result from Theorems 1 and 2. Step 3 in Algorithm 1 strictly decreases the objective function of Eq. (4) at each iteration and thus the algorithm does not cycle. Since the objective function of Eq. (4) is convex and quadratic, and the feasible solution region is bounded, the objective function is bounded. Therefore, the algorithm must converge to the global optimal solution in a finite number of iterations.

Note that in Step 5, only one dual variable satisfying Eq. (6) need be found. All the dual variables in the set $\mu_N$ are examined only when no dual variable satisfies Eq. (6). It is fast to examine the dual variables in the set $\mu_N$ even if the number of the dual variables is large.

4.2 Comparison with Other Methods

In the max margin optimization problem Eq. (2), only some of the constraints determine the optimal solution. These constraints are called active constraints. Other constraints are automatically met as long as these active constraints are valid. EMML algorithm uses this fact to solve the optimization problem by substantially reducing the number of the dual variables in Eq. (3).

In the recent literature, there are also other methods attempting to reduce the number of the constraints. Taskar et al. [19] reduce the number of the constraints by considering the dual of the loss-augmented problem. However, the number of the constraints in their approach is still large for a large structured output space and a large training set. They do not use the fact that only some of the constraints are active in the optimization problem. Tsochantaridis et al. [21] also propose a cutting plane algorithm which finds a small set of active constraints. One issue of this algorithm is that it needs to compute the most violated constraint which would involve another optimization problem in the output space. In EMML, instead of selecting the most violated constraint, a constraint is arbitrarily selected which violates the optimality condition of the optimization problem. Thus, the selection of the constraint does not involve any optimization problem. Therefore, EMML is much more efficient in learning with a much faster convergence rate.

5. MULTIMODAL DATA MINING

The solution to the Lagrange dual problem makes it possible to capture the semantic relationships among different data modalities. The developed EMML framework is shown to be useful to solve for the general multimodal data mining problem in all the scenarios. Specifically, given a training data set, the direct relationship between the VRep space and the word space using the EMML framework in Algorithm 1 is immediately obtained. Given this obtained direct relationship, various the multimodal data mining scenarios can be facilitated.

5.1 Image Annotation

Image annotation refers to generating annotation words for a given image. First the test image is partitioned into blocks and compute the feature vector in the feature space for each block. The similarity between feature vectors and the VReps in terms of the distance are computed. The top n most-relevant VReps are returned. For each VRep, the score between this VRep and each word is computed as the function $f$ in Eq. (1). Thus, for each of the top n most relevant VReps, the ranking-list of words in terms of the score are provided. These n ranking-lists are merged and sorted to obtain the overall ranking-list of the whole word space. Finally, the top m words are returned as the annotation result.

In this approach, the score between the VReps and the words can be computed in advance. Thus, the computation complexity of image annotation is only related to the number of the VReps. Under the assumption that all the images in the image database follow the same distribution, the number of the VReps is independent of the database scale. Therefore, the computation complexity in this approach is O(1) which is independent of the database scale.

5.2 Word Query

Word query refers to generating corresponding images in response to a query word. For a given word input, the score between each VRep and the word is computed as the function $f$ in Eq. (1). Thus, the top n most relevant VReps are returned. Since for each VRep, we compute the similarity between this VRep and each image in the image database in terms of the distance, for each of those top n most relevant VReps, the ranking-list of images in terms of the distance is provided. These n ranking-lists are then merged and sorted to obtain the overall ranking-list in the image space. Finally, the top m images are returned as the query result.

For each VRep, the similarity between this VRep and each image in the image database can be computed in advance. Similar to the analysis in Sec. 5.1, the computation complexity is only related to the number of the VReps, which is O(1).

5.3 Image Retrieval

Image retrieval refers to generating semantically similar images to a query image. Given a query image, we annotate it using the procedure in Sec. 5.1. In the image database, for each annotation word j there are a subset of images $S_j$ in which this annotation word appears. We then have the union set $S = \cup_j S_j$ for all the annotation words of the query image.

On the other hand, for each annotation word j of the query image, the word query procedure in Sec. 5.2 is used to obtain the related sorted image subset $T_j$ from the image database. These subsets $T_j$ are merged to form the sorted image set T in terms of their scores. The final image retrieval result is $R = S \cap T$.

In this approach, the synergy between the image space and the word space is exploited to reduce the semantic gap based on the developed learning approach. Since the complexity of the retrieval methods in Secs. 5.1 and 5.2 are both O(1), and since these retrievals are only returned for the top few items, respectively, finding the intersection or the union is O(1). Consequently, the overall complexity is also O(1).

5.4 Multimodal Image Retrieval

The general scenario of multimodal image retrieval is a query as a combination of a series of images and a series of words. Clearly, this retrieval is simply a linear combination of the retrievals in Secs. 5.2 and 5.3 by merging the retrievals together based on their corresponding scores. Since each individual retrieval is O(1), the overall retrieval is also O(1).

5.5 Across-Stage Inferencing

For a fruit fly embryo image database such as the Berkeley Drosophila embryo image database which is used for experimental evaluations, we have embryo images classified in advance into different stages of the embryo development with separate sets of textual words as annotation to those images in each of these stages. In general, images in different stages may or may not have the direct semantic correspondence (e.g., they all correspond to the same gene), not even speaking that images in different stages may necessarily exhibit any visual similarity. FIG. 2 shows an example of a pair of embryo images at stages 9-10 (FIG. 2(a)) and stages 13-16 (FIG. 2(b)), respectively. They both correspond to the same gene in the two different stages. (The Berkeley *Drosophila* embryo image database is given in such a way that images from several real stages are mixed together to be considered as one "stage". Thus, stages 9-10 are considered as one stage, and so are stages 13-16.) However, it is clear that they exhibit a very large visual dissimilarity.

Consequently, it is not appropriate to use any pure visual feature based similarity retrieval method to identify such image-to-image correspondence across stages. Furthermore, we also expect to have the word-to-image and image-to-word inferencing capabilities across different stages, in addition to the image-to-image inferencing.

Given this consideration, this is exactly where the proposed approach for multimodal data mining can be applied to complement the existing pure retrieval based methods to identify such correspondence. Typically in such a fruit fly embryo image database, there are textual words for annotation to the images in each stage. These annotation words in one stage may or may not have the direct semantic correspondence to the images in another stage. However, since the data in all the stages are from the same fruit fly embryo image database, the textual annotation words between two different stages share a semantic relationship which can be obtained by a domain ontology.

In order to apply this approach to this across-stage inferencing problem, each stage is treated as a separate multimedia database, and map the across-stage inferencing problem to a retrieval based multimodal data mining problem by applying the approach to the two stages such that the multimodal query is taken as the data from one stage and pose the query to the data in the other stage for the retrieval based multimodal data mining. FIG. 3 illustrates the diagram of the two stages (state i and state j where i≠j) image-to-image inferencing.

Clearly, in comparison with the retrieval based multimodal data mining analyzed in the previous sections, the only additional complexity here in across-stage inferencing is the inferencing part using the domain ontology in the word space. Typically this ontology is small in scale. In fact, in evaluations for the Berkeley Drosophila embryo image database, this ontology is handcrafted and is implemented as a look-up table for word matching through an efficient hashing function. Thus, this part of the computation may be ignored. Consequently, the complexity of the across-stage inferencing based multimodal data mining is the same as that of the retrieval based multimodal data mining which is independent of database scale.

6. EMPIRICAL EVALUATIONS

While EMML is a general learning framework, and it can also be applied to solve for a general multimodal data mining problem in any application domains, for the evaluation purpose, it is applied to the Berkeley Drosophila embryo image database [1] for the multimodal data mining task addressed herein. The performance of this approach is evaluated using this database for both the retrieval based and the across-stage inferencing based multimodal data mining scenarios. This approach is compared with a state-of-the-art multimodal data mining method MBRM [11] for the mining performance.

In this image database, there are in total 16 stages of the embryo images archived in six different folders with each folder containing two to four real stages of the images; there are in total 36,628 images and 227 words in all the six folders; not all the images have annotation words. For the retrieval based multimodal data mining evaluations, the fifth folder is used as the multimedia database, which corresponds to stages 11 and 12. There are about 5,500 images that have annotation words and there are 64 annotation words in this folder. The whole folder's images are split into two parts (one third and two thirds), with the two thirds used in the training and the one third used in the evaluation testing. For the across-stage inferencing based multimodal data mining evaluations, the fourth and the fifth folders are used for the two stages inferencing evaluations, and use the third, the fourth and the fifth folders for the three stages inferencing evaluations. Consequently, each folder here is considered as a "stage" in the across-stage inferencing based multimodal data mining evaluations. In each of the inferencing scenarios, the same split is used as in the retrieval based multimodal data mining evaluations for training and testing.

In order to facilitate the across-stage inferencing capabilities, the ontology of the words involved in the evaluations may be handcrafted. This is simply implemented as a simple look-up table indexed by an efficient hashing function. For example, cardiac mesoderm primordium in the fourth folder is considered as the same as circulatory system in the fifth folder. With this simple ontology and word matching, the proposed approach may be well applied to this across-stage inferencing problem for the multimodal data mining.

Figure 1:
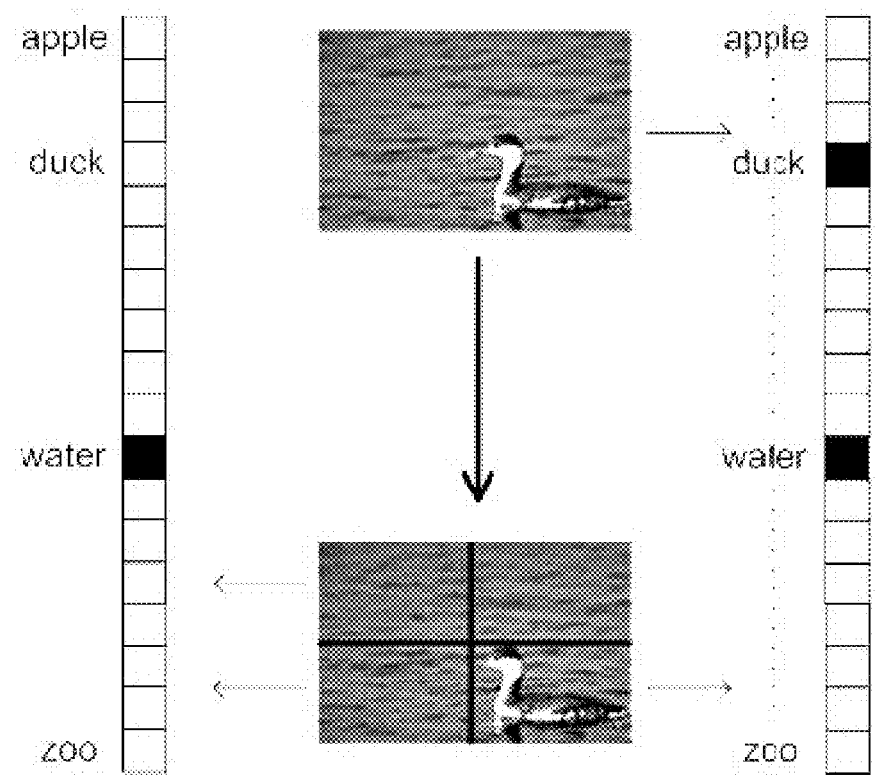
FIG. 1 shows an illustration of the image partitioning and the structured output word space, respectively.
Figure 2:
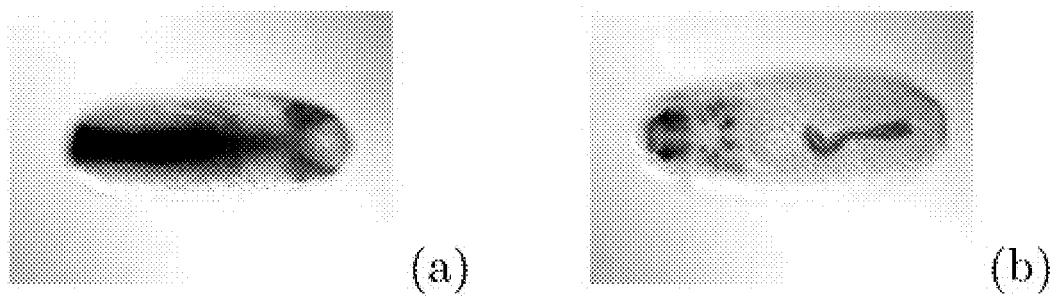
FIGS. 2A and 2B show a pair of embryo images corresponding to the same gene in the two different stages.
Figure 3:
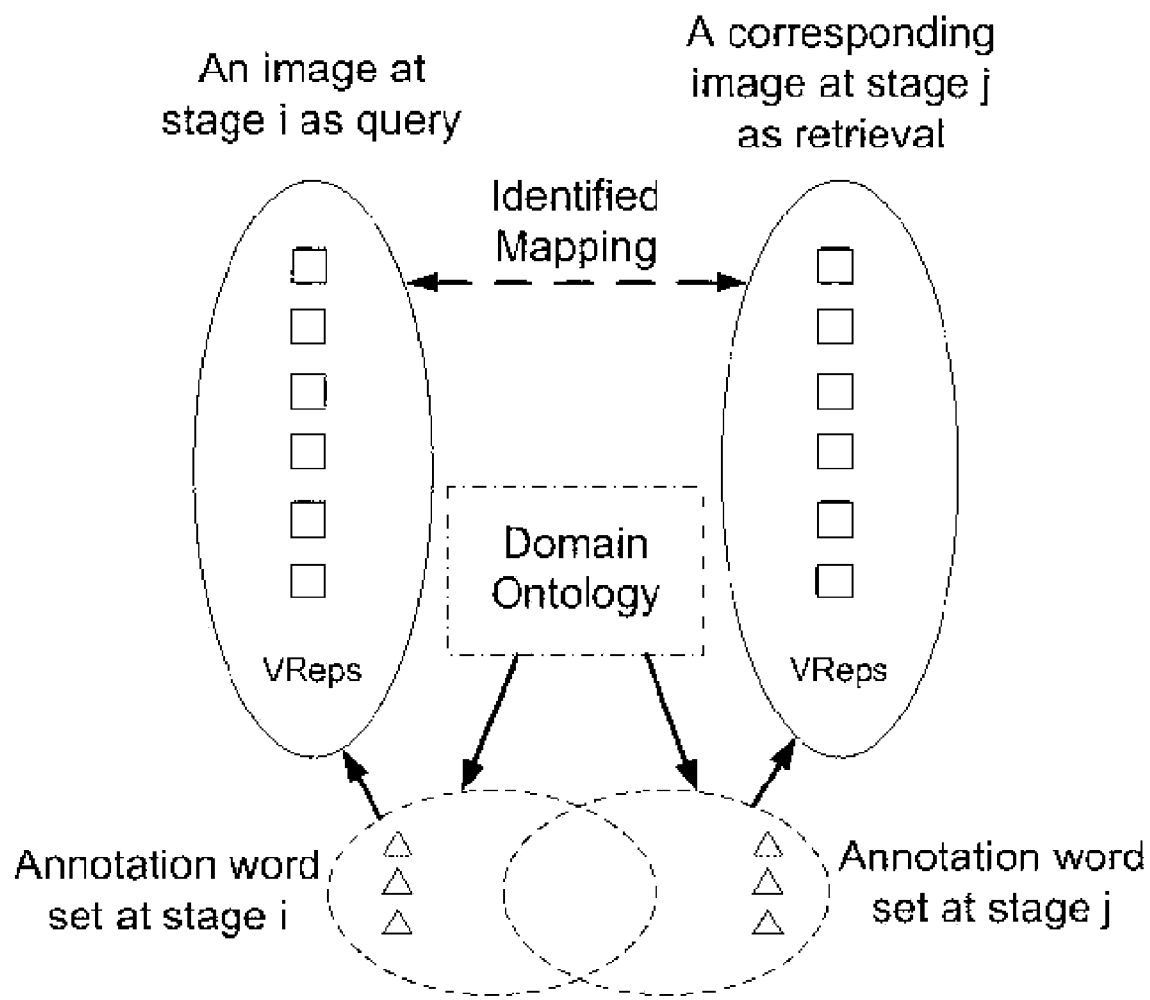
FIG. 3 shows an illustrative diagram for image-to-image across two stages inferencing.
Figure 4:
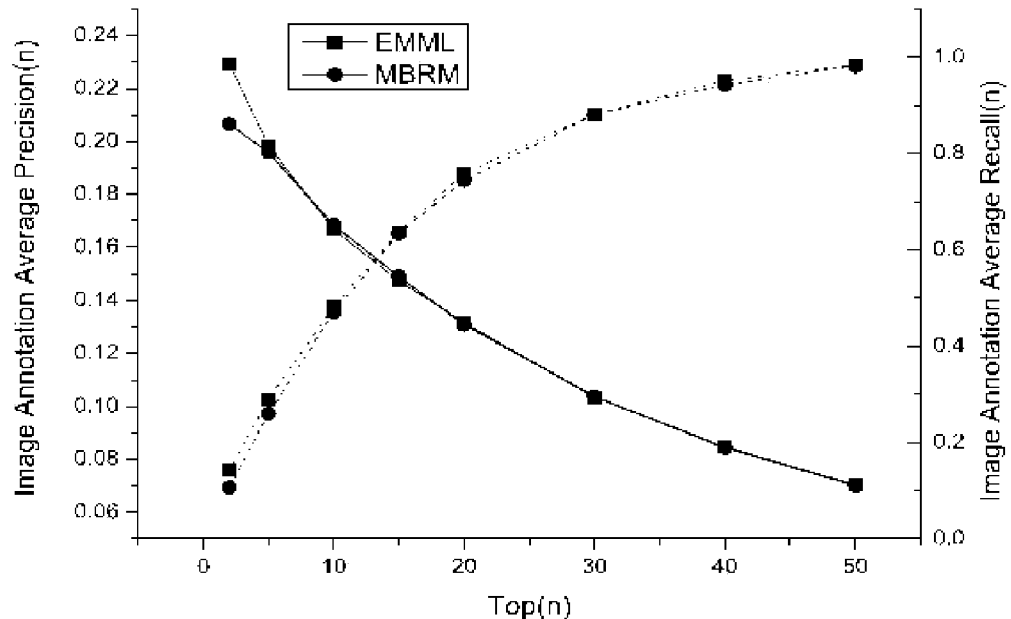
FIG. 4 shows precisions and recalls of image annotation between EMML and MBRM (the solid lines are for precisions and the dashed lines are for recalls).
Figure 5:
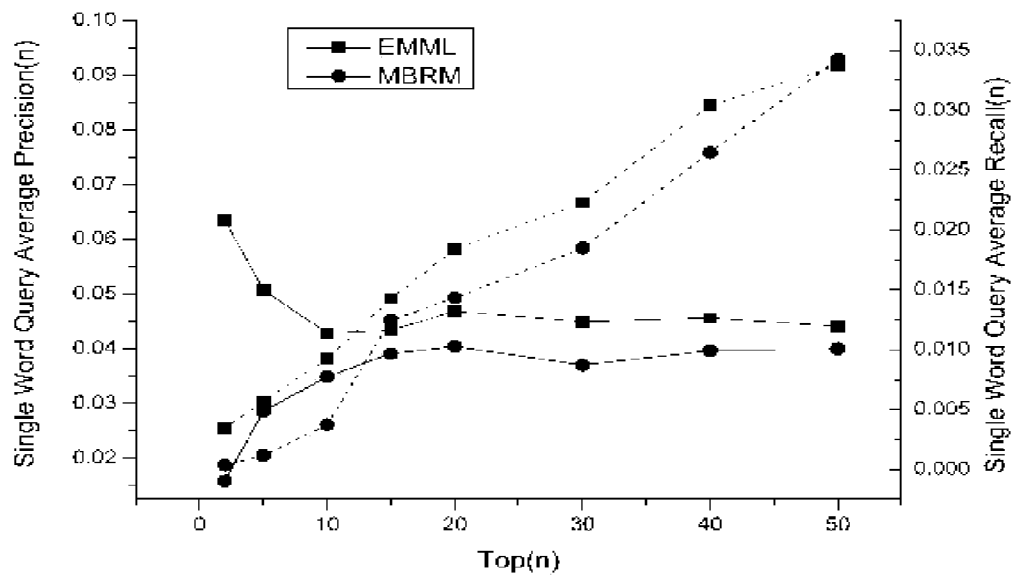
FIG. 5 shows precisions and recalls of word query between EMML and MBRM.
Figure 6:
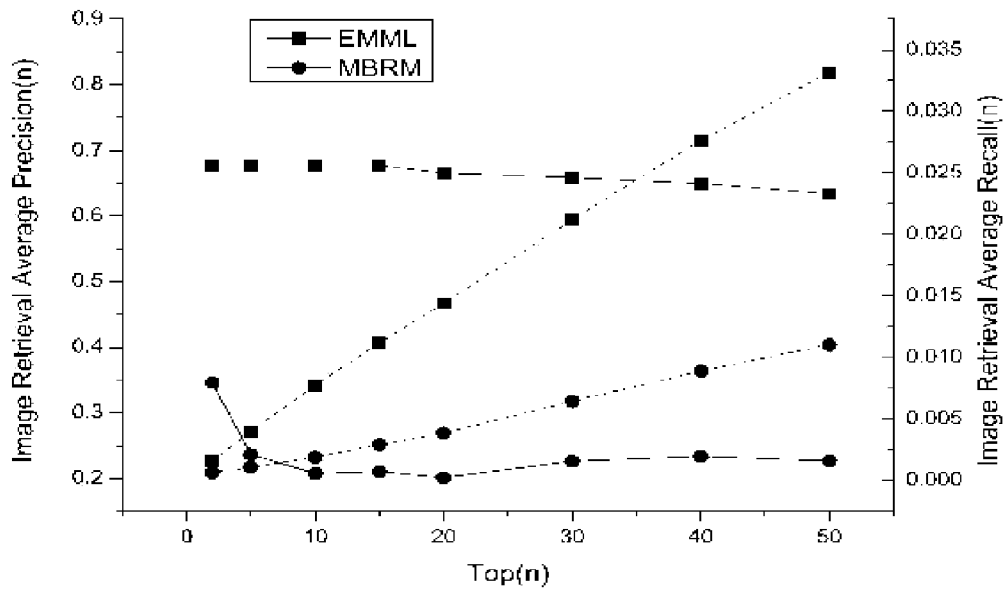
FIG. 6 shows precisions and recalls of image retrieval between EMML and MBRM.

The EMML algorithm is applied to obtain the model parameters. In the figures below, the horizontal axis denotes the number of the top retrieval results. The performance from top 2 to top 50 retrieval results is investigated. FIG. 4 reports the precisions and recalls averaged over 1648 queries for image annotation in comparison with MBRM model where the solid lines are for precisions and the dashed lines are for recalls. Similarly, FIG. 5 reports the precisions and recalls averaged over 64 queries for word query in comparison with MBRM model. FIG. 6 reports the precisions and recalls averaged over 1648 queries for image retrieval in comparison with MBRM model.

Figure 7:
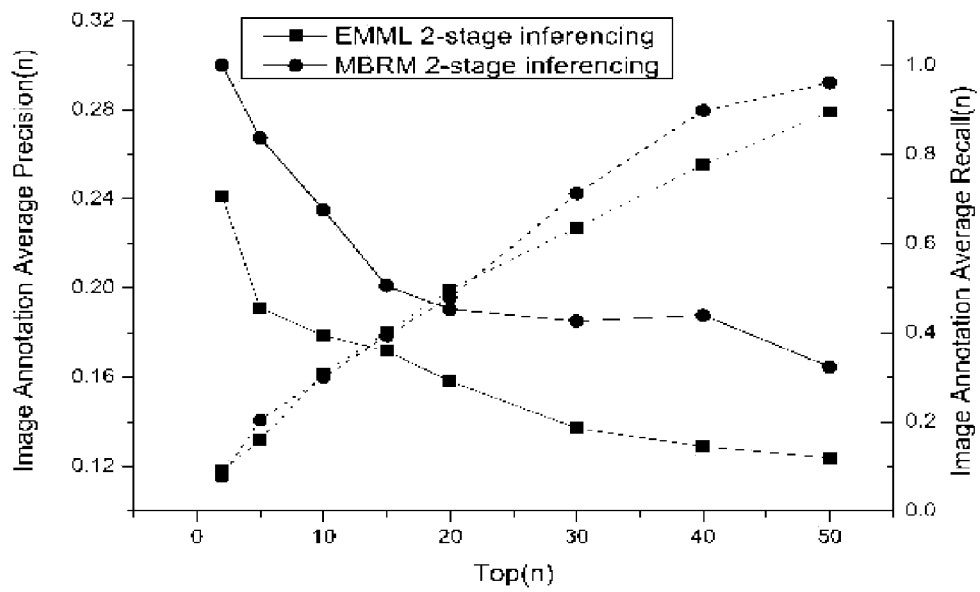
FIG. 7 shows precisions and recalls of 2-stage image to word inferencing between EMML and MBRM.
Figure 8:
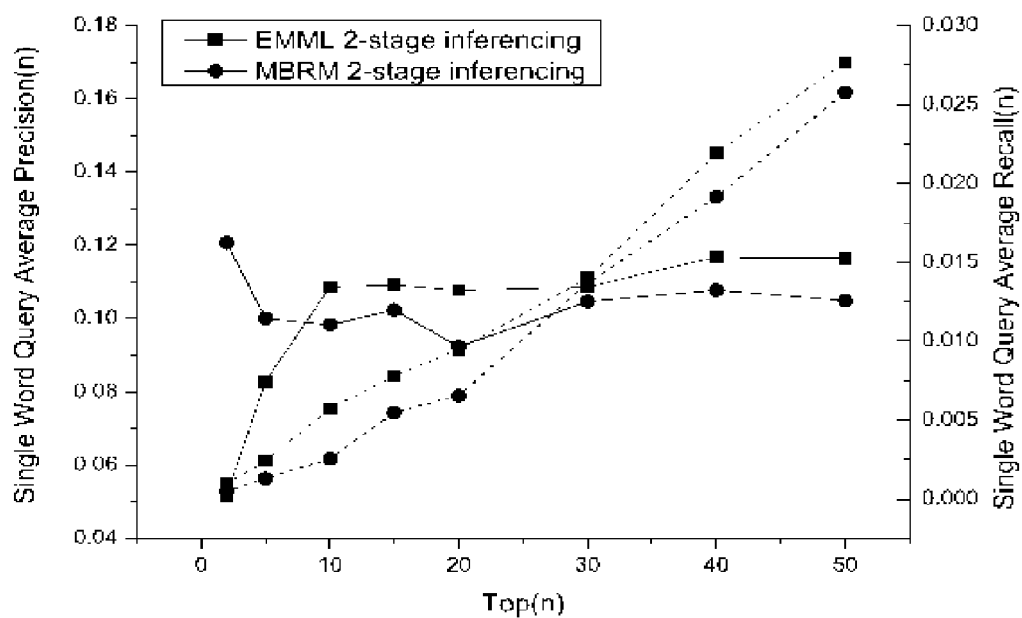
FIG. 8 shows precisions and recalls of 2-stage word to image inferencing between EMML and MBRM.
Figure 9:
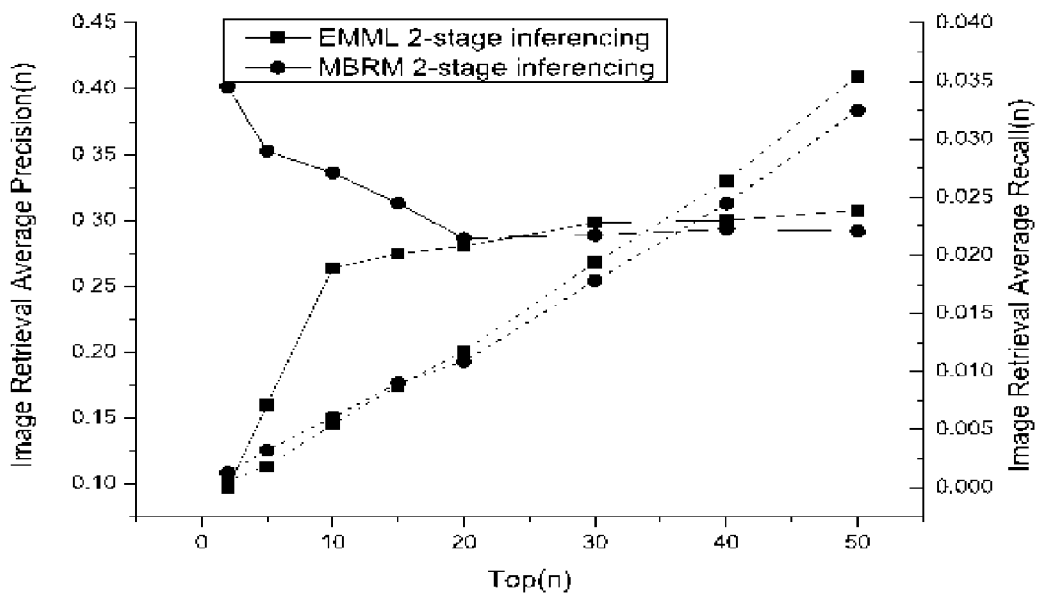
FIG. 9: shows precisions and recalls of 2-stage image to image inferencing between EMML and MBRM.
Figure 10:
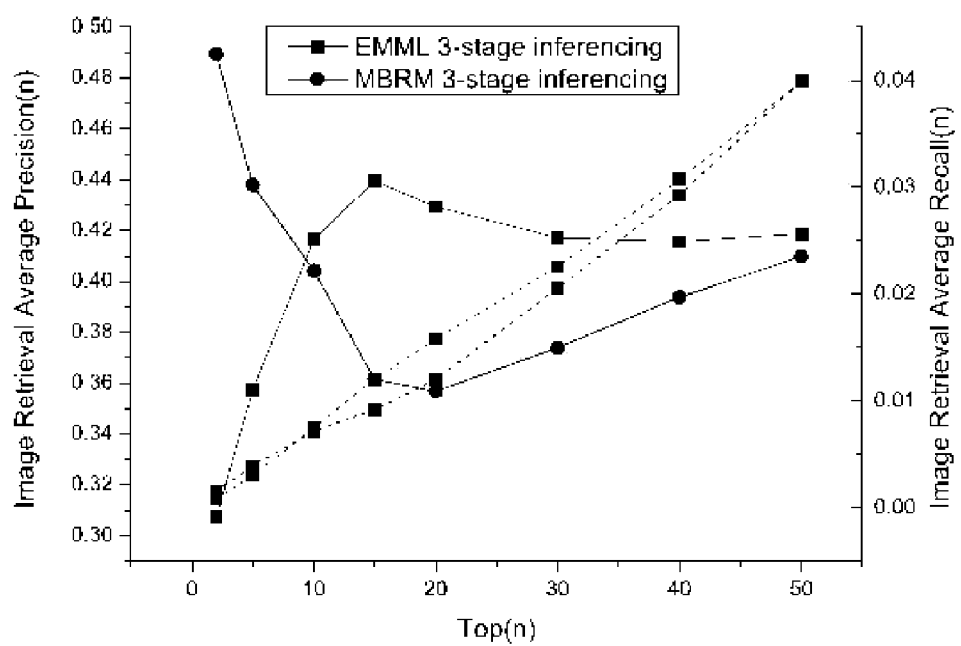
FIG. 10 shows precisions and recalls of 3-stage image to image inferencing between EMML and MBRM.

For the 2-stage inferencing, FIG. 7 reports the precisions and recalls averaged over 1648 queries for image-to-word inferencing in comparison with MBRM model, and FIG. 8 reports the precisions and recalls averaged over 64 queries for word-to-image inferencing in comparison with MBRM model. FIG. 9 reports the precisions and recalls averaged over 1648 queries for image-to-image inferencing in comparison with MBRM model. Finally, for the 3-stage inferencing, FIG. 10 reports precisions and recalls averaged over 1100 queries for image-to-image inferencing in comparison with MBRM model.

In summary, there is no single winner for all the cases. Overall, EMML outperforms MBRM substantially in the scenarios of word query and image retrieval, and slightly in the scenario of 2-stage word-to-image inferencing and 3-stage image-to-image inferencing. On the other hand, MBRM has a slight better performance than EMML in the scenario of 2-stage image-to-word inferencing. For all other scenarios the two methods have a comparable performance. In order to demonstrate the strong scalability of EMML approach to multimodal data mining, image annotation is taken as a case study and the scalability compared between EMML and MBRM. Three subsets of the embryo image database are randomly selected in different scales (50, 100, 150 images, respectively), and both methods applied to the subsets to measure the query response time. The query response time is obtained by taking the average response time over 1648 queries. Since EMML is implemented in MATLAB environment and MBRM is implemented in C in Linux environment, to ensure a fair comparison, the scalability is reported as the relative ratio of a response time to the baseline response time for the respective methods. Here the baseline response time is the response time to the smallest scale subset (i.e., 50 images). Table 1 documents the scalability comparison. Clearly, MBRM exhibits a linear scalability with respect to the database size while that of EMML is constant. This is consistent with the scalability analysis in Sec. 5.

TABLE 1

Comparison of scalability

| | Database Size | | |
|---|---|---|---|
| | 50 | 100 | 150 |
| EMML | 1 | 1 | 1 |
| MBRM | 1 | 2.2 | 3.3 |

In order to verify the fast learning advantage of EMML in comparison with the existing max margin based learning literature, one of the most recently proposed max margin learning methods by Taskar et al. [19] ws implemented. For the reference purpose, this method is called TCKG. Both EMML and TCKG have been applied to a small data set randomly selected from the whole Berkeley embryo database, consisting of 110 images along with their annotation words. The reason this small data set is used for the comparison is that it has been found that in MATLAB platform TCKG immediately runs out of memory when the data set is larger, due to the large number of the constraints, which is typical for the existing max margin learning methods. Under the environment of 2.2 GHz CPU and 1 GB memory, TCKG takes about 14 hours to complete the learning for such a small data set while EMML only takes about 10 minutes. The number of the constraints reduced has been examined in both methods during their executions for this data set. EMML has reduced the number of the constraints in a factor of 70 times more than that reduced by TCKG. This explains why EMML is about 70 times faster than TCKG in learning for this data set.

7. CONCLUSION

A new max margin learning framework is developed—the enhanced max margin learning (EMML), and applied it to developing an effective and efficient multimodal data mining solution. EMML attempts to find a small set of active constraints, and thus is more efficient in learning than the existing max margin learning literature. Consequently, it has a much faster convergence rate which is verified in empirical evaluations. The multimodal data mining solution based on EMML is highly scalable in the sense that the query response time is independent of the database scale. This advantage is also supported through the complexity analysis as well as empirical evaluations. While EMML is a general learning framework and can be used for general multimodal data mining, for the evaluation purpose, it has been applied to the Berkeley *Drosophila* embryo image database and have reported the evaluations against a state-of-the-art multimodal data mining method.

The present method may be implemented on a general purpose computer or a specially adapted machine. Typically, a programmable processor will execute machine-readable instructions stored on a computer-readable medium. In other cases, the method will be implemented using application specific hardware, and may not be reprogrammable.

An exemplary programmable computing device for implementing an embodiment of the invention includes at least a processing unit and a memory. Depending on the exact configuration and type of computing device, the memory may be volatile (such as RAM), non-volatile (such as ROM, flash memory, etc.) or some combination of the two. Additionally, the device may also have additional features/functionality. For example, the device may also include additional storage (removable and/or non-removable) including, but not limited to, magnetic or optical disks or tapes. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory, FRAM, or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device. The device may also contain one or more communications connections that allow the device to communicate with other devices. Such communication connections may include, for example, Ethernet, wireless communications, optical communications, serial busses, parallel busses, and the like. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

One use for the present method is to process information databases, which may be private or public. For example, the information database may comprise information received from the Internet, such as the content of various web pages from world wide web sites, or other information found on the Internet. In other cases, the data may be more structured, for example the content of the Facebook social networking site/system. Further, the information may be private user information, such as the contents of a user's hard drive, especially, for example, the user generated or downloaded content.

Having described specific embodiments of the present invention, it will be understood that many modifications thereof will readily appear or may be suggested to those skilled in the art, and it is intended therefore that this invention is limited only by the spirit and scope of the following claims.

9. REFERENCES

[1] www.fruitfly.org/.
[2] Y. Altun, I. Tsochantaridis, and T. Hofmann. Hidden markov support vector machines. In *Proc. ICML*, Washington D.C., 2003.
[3] K. Barnard, P. Duygulu, D. Forsyth, N. de Freitas, D. M. Blei, and M. I. Jordan. Matching words and pictures. *Journal of Maching Learning Research*, 3:1107-1135, 2003.
[4] D. Blei and M. Jordan. Modeling annotated data. In *Proceedings of the 26th annual International ACM SIGIR Conference on Research and Development in Information Retrieval*, pages 127-134, 2003.
[5] S. Boyd and L. Vandenberghe. *Convex Optimization*. Cambridge University Press, 2004.
[6] U. Brefeld and T. Scheffer. Semi-supervised learning for structured output variables. In *Proc. ICML*, Pittsburgh, Pa., 2006.
[7] E. Chang, K. Goh, G. Sychay, and G. Wu. Cbsa: content-based soft annotation for multimodal image retrieval using bayes point machines. *IEEE Trans. on Circuits and Systems for Video Technology*, 13:26-38, January 2003.
[8] W. Chu, Z. Ghahramani, and D. L. Wild. A graphical model for protein secondary structure prediction. In *Proc. ICML*, Banff, Canada, 2004.
[9] R. Datta, W. Ge, J. Li, and J. Z. Wang. Toward bridging the annotation-retrieval gap in image search by a generative modeling approach. In *Proc. ACM Multimedia*, Santa Barbara, Calif., 2006.
[10] P. Duygulu, K. Barnard, N. de Freitas, and D. Forsyth. Object recognition as machine translation: Learning a lexicon for a fixed image vocabulary. In *Seventh European Conference on Computer Vision*, volume IV, pages 97-112, 2002.
[11] S. L. Feng, R. Manmatha, and V. Lavrenko. Multiple bernoulli relevance models for image and video annotation. In *International Conference on Computer Vision and Pattern Recognition*, Washington D.C., 2004.
[12] Y. Freund and R. E. Schapire. Large margin classification using the perceptron algorithm. In *Maching Learning*, volume 37, 1999.
[13] H. D. III and D. Marcu. Learning as search optimization: Approximate large margin methods for structured prediction. In *Proc. ICML*, Bonn, Germany, 2005.

[14] J. Lafferty, A. McCallum, and F. Pereira. Conditional random fields: Probabilistic models for segmenting and labeling sequence data. In *Proc. ICML,* 2001.

[15] A. McCallum, D. Freitag, and F. Pereira. Maximum entropy markov models for information extraction and segmentation. In *Proc. ICML,* 2000.

[16] E. Osuna, R. Freund, and F. Girosi. An improved training algorithm for support vector machines. In *Proc. of IEEE NNSP '97,* Amelia Island, Fla., September 1997.

[17] J.-Y. Pan, H.-J. Yang, C. Faloutsos, and P. Duygulu. Automatic multimedia cross-modal correlation discovery. In *Proceedings of the* 10*th ACM SIGKDD Conference,* Seattle, Wash., 2004.

[18] A. W. M. Smeulders, M. Worring, S. Santini, A. Gupta, and R. Jain. Content-based image retrieval at the end of the early years. *IEEE Trans. on Pattern Analysis and Machine Intelligence,* 22:1349-1380, 2000.

[19] B. Taskar, V. Chatalbashev, D. Koller, and C. Guestrin. Learning structured prediction models: A large margin approach. In *Proc. ICML,* Bonn, Germany, 2005.

[20] B. Taskar, C. Guestrin, and D. Koller. Max-margin markov networks. In *Neural Information Processing Systems Conference,* Vancouver, Canada, 2003.

[21] I. Tsochantaridis, T. Hofmann, T. Joachims, and Y. Altun. Support vector machine learning for interdependent and structured output spaces. In *Proc. ICML, Banff, Canada,* 2004.

[22] V. N. Vapnik. *The nature of statistical learning theory.* Springer, 1995.

[23] Y. Wu, E. Y. Chang, and B. L. Tseng. Multimodal metadata fusion using causal strength. In *Proc. ACM Multimedia,* pages 872-881, Hilton, Singapore, 2005.

What is claimed is:

1. A data mining method, comprising:
receiving a set of multimodal data objects comprising semantically interrelated information of a first type and a second type, each being of a different type selected from the group consisting of image information, audio information, video information, and semantic information;
representing at least the first type of information of the multimodal data objects as feature vectors within a feature space comprising the first type of information and the second type of information, and the semantic interrelation between the first type of information and the second type of information;
clustering the feature vectors into classified clusters according to at least one semantic clustering criterion by at least one automated processor, to thereby determine a classification of the respective feature vectors;
associating data objects with respective members of the set of multimodal data objects by the at least one automated processor, based on the clustering, the associated data objects comprising information of a third type semantically interrelated to the second type of information, selected from the group consisting of images, audio, video and semantic information, wherein the type of information of the third type is distinct from the type of information of the first type;
estimating a joint feature representation of the set of multimodal data objects and the associated data objects by the at least one automated processor;
optimizing the joint feature representation by the at least one automated processor to provide a structured output space of interdependent objects, based on at least a prediction error criterion, by iteratively solving a dual problem by selectively partitioning data objects into a working set and a non-working set, comprising:
moving the data objects in the non-working set that can be moved without changing an objective function to the working set, and
moving the data objects in the working set that can be moved with a decrease in the objective function to the non-working set;
receiving a query represented according to the first type of information; and
identifying data objects from the set of multimodal data objects that correspond to the query by the at least one automated processor, based on at least the structured output space of interdependent multimodal objects.

2. The method according to claim 1, wherein the set of multimodal data objects comprise image information and annotations of the image information.

3. The method according to claim 1, wherein the first type of information comprises image information and the second type of information comprises semantic information.

4. The method according to claim 1, wherein the first type of information comprises image information and the second type of information comprises audio information.

5. The method according to claim 1, wherein the first type of information comprises semantic information and the second type of information comprises audio information.

6. The method according to claim 1, wherein the multimodal data objects comprise semantic information, image information and audio information.

7. The method according to claim 1, wherein the first type of information comprises semantic information, the third type of information comprises image information, wherein the query comprises a textual word query; and said identifying comprises retrieving multimodal data objects comprising image information which corresponds the textual word query.

8. The method according to claim 1, wherein the first type of information comprises at least one of image information, audio information and video information, and the third type of information comprises semantic information which represents an annotation of the first type of information for the respective multimodal data object after the associating.

9. The method according to claim 1, further comprising providing within the set of multimodal data objects labeled examples which each comprise a non-semantic representation of an item and at least one semantic label variable within the structured output space of interdependent objects.

10. The method according to claim 1, wherein said optimizing comprises representing a respective multimodal data object as a mathematical weighted combination of a set of joint feature representation components, and optimizing a weighting for a plurality of components of the mathematical weighted combination with respect to a prediction error between a predicted classification and a training classification based on a training example, by iteratively solving a Lagrange dual problem by partitioning the Lagrange multipliers into an active set and an inactive set, wherein the Lagrange multiplier for a member of the active set is greater than or equal to zero and the Lagrange multiplier for a member of the inactive set is zero, moving members of the active set having zero-valued Lagrange multipliers to the inactive set without changing an objective function and moving members of the inactive set to the active set which result in a decrease in the objective function.

11. A data mining system, comprising:
an input configured to receive receiving a set of multimodal data objects comprising semantically interrelated information of a first type and information of a second type, each of the first type and the second type being different and being selected from the group consisting of image information, audio information, video information, and semantic information;

an automated processor, configured to:
- represent at least the first type of information of the multimodal data objects as feature vectors within a feature space comprising the first type of information and the second type of information, and the semantic interrelation between the first type of information and the second type of information;
- cluster the feature vectors according to at least one clustering criterion, to thereby determine a classification of the respective feature vectors;
- associate data objects comprising information of a third type semantically interrelated to the second type of information, selected from the group consisting of images, audio, video and semantic information, wherein the type of information of the third type is distinct from the type of information of the first type, with respective multimodal data objects based on the clustering;
- estimate a joint feature representation of the set of multimodal data objects and the associated data objects;
- optimize the joint feature representation to provide a structured output space of interdependent objects, based on at least a prediction error criterion, by iteratively solving a dual problem by selectively partitioning data objects into a working set and a non-working set, comprising:
  - moving the data objects in the non-working set that can be moved without changing an objective function to the working set, and
  - moving the data objects in the working set that can be moved with a decrease in the objective function to the non-working set;
- receive a query represented according to the first type of information; and
- identify data objects from the set of multimodal data objects that correspond to the query by the at least one automated processor, based on at least the structured output space of interdependent multimodal objects; and an output port from the automated processor, configured to communicate at least one of the identified data objects and identifiers of the identified data objects.

12. The system according to claim 11, wherein the multimodal data set comprises at least one of image information and audio information as the first type of information, and semantic information representing annotations of the multimodal data objects as the second type of information.

13. The system according to claim 11, wherein the first type of information comprises at least one of image information, audio information and video information, and the second type of information comprises semantic information which represents an annotation of the first type of information for the respective multimodal data object after the association.

14. The system according to claim 11, wherein the automated processor is configured to optimize by representing a respective multimodal data object as a mathematical weighted combination of a set of joint feature representation components, and optimizing a weighting for a plurality of components of the mathematical weighted combination with respect to a prediction error between a predicted classification and a training classification based on a training example, by iteratively solving a Lagrange dual problem by partitioning the Lagrange multipliers into an active set and an inactive set, wherein the Lagrange multiplier for a member of the active set is greater than or equal to zero and the Lagrange multiplier for a member of the inactive set is zero, moving members of the active set having zero-valued Lagrange multipliers to the inactive set without changing an objective function and moving members of the inactive set to the active set which result in a decrease in the objective function.

15. The system according to claim 11, wherein the automated processor is configured to optimize the joint feature representation by at least solving a Lagrange dual problem by partitioning Lagrange multipliers into an active set and an inactive set, wherein the active set has Lagrange multipliers greater than or equal to zero and the inactive set has Lagrange multipliers which are zero, iteratively moving members of the active set having zero-valued Lagrange multipliers to the inactive set without changing an objective function and moving members of the inactive set to the active set which result in a decrease in the objective function.

16. A data mining method, comprising:
- receiving a set of multimodal data objects comprising both semantic information and semantically interrelated image information;
- representing the multimodal data objects as feature vectors;
- clustering the feature vectors in a feature space according to a semantic clustering criterion within a feature space comprising the image information and the semantic information by at least one automated processor, to thereby determine a classification of the respective feature vectors;
- storing data in a memory representing a joint feature representation of the multimodal data objects to provide a structured output space of interdependent objects, by representing respective multimodal data objects as a mathematical weighted combination of a set of joint feature representation components, and optimizing a weighting for a plurality of components of the mathematical weighted combination with respect to a prediction error between a predicted classification and a training classification based on a training example, by iteratively solving a Lagrange dual problem to partition the Lagrange multipliers into an active set and an inactive set, wherein the Lagrange multiplier for a member of the active set being greater than or equal to zero and the Lagrange multiplier for a member of the inactive set being zero, moving members of the active set having zero-valued Lagrange multipliers to the inactive set without changing an objective function and moving members of the inactive set to the active set which result in a decrease in the objective function;
- receiving a query represented according to the semantic information or semantically interrelated image information; and
- identifying data objects from the set of multimodal data objects that correspond to the query by the at least one automated processor, based on at least the structured output space of interdependent multimodal objects.

* * * * *